(12) United States Patent
Hasegawa et al.

(10) Patent No.: US 7,732,771 B2
(45) Date of Patent: *Jun. 8, 2010

(54) MONITORING APPARATUS

(75) Inventors: Hiroyuki Hasegawa, Tokyo (JP);
Masaaki Kurebayashi, Shizuoka (JP);
Mikiko Mase, Aichi (JP)

(73) Assignee: Sony Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 12/174,118

(22) Filed: Jul. 16, 2008

(65) Prior Publication Data

US 2008/0277585 A1    Nov. 13, 2008

Related U.S. Application Data

(63) Continuation of application No. 11/155,651, filed on Jun. 20, 2005, now Pat. No. 7,423,272.

(30) Foreign Application Priority Data

Jun. 25, 2004 (JP) ............................. 2004-188526

(51) Int. Cl.
*G01J 5/02* (2006.01)
(52) U.S. Cl. ............................. 250/339.05; 250/DIG. 1
(58) Field of Classification Search ................ 250/334, 250/339.05, 370.08, 339.14, 370.1, DIG. 1
See application file for complete search history.

(56) References Cited

U.S. PATENT DOCUMENTS

| 3,543,028 | A | 11/1970 | Jones |
|---|---|---|---|
| 4,849,737 | A | 7/1989 | Kirihata et al. |
| 4,994,670 | A | 2/1991 | Noble et al. |
| 5,001,348 | A | 3/1991 | Dirscherl et al. |
| 5,107,117 | A | 4/1992 | Ennenga et al. |
| 5,663,825 | A | 9/1997 | Amon et al. |
| 5,686,889 | A | 11/1997 | Hillis |
| 6,009,190 | A | 12/1999 | Szeliski et al. |
| 6,055,292 | A | 4/2000 | Zeller et al. |
| 6,281,970 | B1 | 8/2001 | Williams et al. |
| 6,323,941 | B1 | 11/2001 | Evans et al. |

(Continued)

FOREIGN PATENT DOCUMENTS

JP    1-268284    10/1989

(Continued)

*Primary Examiner*—David P Porta
*Assistant Examiner*—Carolyn Igyarto
(74) *Attorney, Agent, or Firm*—Oblon, Spivak, McClelland, Maier & Neustadt, L.L.P.

(57) ABSTRACT

An imaging apparatus includes a camera unit, a panorama-image generating section generating a panorama image of the entire area by combining a plurality of unit images obtained by the camera unit, a panorama-image storage/management section storing and managing the panorama image generated by the panorama-image generating section, an infrared camera photographing an object that has a temperature falling within a preset temperature range as an infrared image, a direction controller sequentially shifting the photographing direction of the infrared camera within the area being photographed, an infrared-image generating section combining a plurality of infrared images provided by the infrared camera, an image-synthesizing section synthesizing the panorama image generated by the panorama-image generating section, with the panorama infrared image generated by the infrared-image generating section, and a display displaying the synthesized image generated by the image-synthesizing section.

12 Claims, 6 Drawing Sheets

U.S. PATENT DOCUMENTS

| | | |
|---|---|---|
| 6,462,663 B1 | 10/2002 | Wilson et al. |
| 7,186,963 B2 | 3/2007 | Hughes et al. |
| 7,459,685 B2 * | 12/2008 | Ikeda .................... 250/334 |
| 2002/0180759 A1 | 12/2002 | Park et al. |

FOREIGN PATENT DOCUMENTS

| | | |
|---|---|---|
| JP | 4-699 | 1/1992 |
| JP | 10-108163 | 4/1998 |
| JP | 11-284988 | 10/1999 |
| JP | 2000-243062 | 9/2000 |
| JP | 2001-292421 | 10/2001 |
| JP | 2003-324717 | 11/2003 |

* cited by examiner

MONITORING APPARATUS

CROSS REFERENCES TO RELATED APPLICATIONS

This application is a continuation of U.S. application Ser. No. 11/155,651, filed Jun. 20, 2005, and is based upon and claims the benefit of priority from prior Japanese Patent Application No. 2004-188526, filed Jun. 25, 2004, the entire contents of each of which are incorporated herein by reference.

BACKGROUND

1. Field of the Invention

The present invention relates to an imaging apparatus, method and program, for monitoring events occurring in a broad area, from a panorama image obtained by photographing the area while sequentially changing the photographing direction. The invention also relates to a recording medium and an imaging system.

2. Description of the Related Art

In any electronic still camera hitherto used widely, the solid-state imaging element such as a CCD converts the light coming from an object through the lenses to an image signal. The image signal is recorded in a recording medium. The image signal can be reproduced from the recording medium. Most electronic still cameras have a monitor that can display any still picture recorded and selected. In the electronic still camera, the image signal supplied to the monitor represents one image of the object. The image displayed covers only a small area. From the image it is impossible to monitor events that are happening in a broad area.

In view of this, monitor cameras are used in increasing numbers. Each monitor camera photographs an object, while the photographing direction is sequentially changed, thus providing a plurality of images. The images are synthesized into a panorama image, from which the events occurring in a broad area can be monitored. Particularly in recent years, there has been proposed the technique of reducing and combining a plurality of video signals, thus generating a one-frame video signal (see, for example, Japanese Patent Application Laid-Open Publication No. 10-108163). An integrated monitor/recorder system has been proposed, in which images are collected from monitor video cameras and recorded in a recording medium such as video tape, thereby to monitor a broad area (see, for example, Japanese Patent Application Laid-Open Publication No. 2000-243062).

SUMMARY OF THE INVENTION

Assume a monitor camera is installed in an area which unauthorized persons are forbidden to enter. Then, it is most important for the camera to efficiently and reliably photograph any intruders.

To detect any changes in the monitored area, from the images recorded in a recording medium such as video tape, however, a watchman must carefully observe all images, each input every time the camera scans the area. He or she needs to find any change in the image, however small it is, or perceive any object that appears, however small it is. Tremendous labor and time are required. In addition, changes in the area may be overlooked because this system depends on the eyes of the watchman.

When the area is monitored at night, the watchman cannot help but try to find intruders, if any, from the dark images the camera has photographed. It is extremely difficult for him or her to detect intruders, particularly if the area being monitored is large.

The dark images photographed at night disable the watchman to determine in which building an intruder has entered the premises, or in which route the intruder has walked. The broader the area monitored, the more difficult it is to determine the behavior of the intruder.

The present invention has been made in consideration of the foregoing. It is desirable to provide an imaging apparatus and an imaging method, which can monitor a broad area, day and night, to watch a specific object, such as a man, in connection with the background. It is also desirable to provide a program that enables computers to perform the method, a recording medium in which the program is recorded, and an imaging system storing the program.

According to the present invention, there is provided an imaging apparatus comprising:

an imaging means for photographing an area, while sequentially setting a photographing direction to unit images that constitute a panorama image of the entire area;

a panorama-image generating means for generating a panorama image by combining a plurality of unit images obtained by the imaging means;

a panorama-image storage/management means for storing and managing the panorama image generated by the panorama-image generating means;

a thermography imaging means for photographing an object that has a temperature falling within a preset temperature range as a thermal image;

a direction control means for sequentially shifting the photographing direction of the thermography imaging means within the area being photographed;

a thermal-image generating means for combining a plurality of thermal images provided by the thermography imaging means, thereby to generate a panorama thermal image of the entire area;

an image-synthesizing means for synthesizing the panorama image generated by the panorama-image generating means, with the panorama thermal image generated by the thermal-image generating means; and an image-displaying means for displaying the synthesized image generated by the image-synthesizing means.

According to the present invention, there is also provided an imaging method comprising the steps of:

photographing an area, while sequentially setting a photographing direction to unit images that constitute a panorama image of the entire area;

generating a panorama image by combining a plurality of unit images obtained in the photographing step;

storing and managing the panorama image generated in the panorama-image generating step;

controlling a thermography imaging unit for photographing an object that has a temperature falling within a preset temperature range as a thermal image, while sequentially shifting the photographing direction of the thermography imaging unit within the area being photographed;

generating a panorama thermal image of the entire area by combining a plurality of thermal images provided by the thermography imaging unit;

synthesizing the panorama image generated in the panorama-image generating step, with the panorama thermal image generated in the thermal-image generating step; and displaying the synthesized image generated in the image-synthesizing step.

According to the present invention, there is also provided a program for causing computers to perform the steps of:

photographing an area, while sequentially setting a photographing direction to unit images that constitute a panorama image of the entire area;

generating a panorama image by combining a plurality of unit images obtained in the photographing step;

storing and managing the panorama image generated in the panorama-image generating step;

controlling a thermal camera in a thermography imaging unit that photographs an object having a temperature falling within a preset temperature range as a thermal image, while sequentially shifting the photographing direction of the thermography imaging unit within the area being photographed;

generating a panorama thermal image of the entire area by combining a plurality of thermal images provided by the thermography imaging unit;

synthesizing the panorama image generated in the panorama-image generating step, with the panorama thermal image generated in the thermal-image generating step; and displaying the synthesized image generated in the image-synthesizing step.

According to the present invention, there is also provided a recording medium storing a program for causing computers to perform the steps of:

photographing an area, while sequentially setting a photographing direction to unit images that constitute a panorama image of the entire area;

generating a panorama image by combining a plurality of unit images obtained in the photographing step;

storing and managing the panorama image generated in the panorama-image generating step;

controlling a thermal camera in a thermography imaging unit that photographs an object having a temperature falling within a preset temperature range as a thermal image, while sequentially shifting the photographing direction of the thermography imaging unit within the area being photographed;

generating a panorama thermal image of the entire area by combining a plurality of thermal images provided by the thermography imaging unit;

synthesizing the panorama image generated in the panorama-image generating step, with the panorama thermal image generated in the thermal-image generating step; and displaying the synthesized image generated in the image-synthesizing step.

According to the present invention, there is also provided an imaging system comprising:

an imaging means;

a thermography imaging means for photographing an object that has a temperature falling within a preset temperature range as a thermal image;

a control apparatus including:

a panorama-image generating means for generating a panorama image of the entire area by combining a plurality of unit images obtained by the imaging means;

a panorama-image storage/management means for storing and managing the panorama image generated by the panorama-image generating means;

a direction control means for sequentially shifting the photographing direction of the thermography imaging means within the area being photographed;

a thermal-image generating means for combining a plurality of thermal images provided by the thermography imaging means, thereby to generate a panorama thermal image of the entire area; and an image-synthesizing means for synthesizing the panorama image generated by the panorama-image generating means, with the panorama thermal image generated by the thermal-image generating means; and at least one terminal device that is configured to access the control apparatus through a network, to acquire the synthesized image generated by the image-synthesizing means, by accessing the control apparatus, and to display the synthesized image acquired.

In the present invention, the thermography imaging unit that photographs an object existing in an area and having a temperature falling within a preset temperature range is sequentially shifted in terms of photographing direction. A plurality of thermal images provided by the thermography imaging unit are combined, forming a panorama thermal image. The panorama thermal image is synthesized with a panorama image provided by a visible-light camera, thereby forming a synthesized image. The synthesized image is displayed.

Hence, the invention enables a watchman to perceive the movement or change of any person in the area photographed, from the luminance distribution shown in the thermal image. Therefore, the watchman need not observe all images, each input every time the camera scans the area. His or her labor can be much reduced. In addition, the invention prevents the watchman from overlooking changes in the area. The invention therefore helps to achieve very reliable surveillance, because even a little movement of the person can be detected. In addition, the region in which the object exists can be identified, even at night, with the luminance distribution of the thermal image. Thus, the position of the region can be reliably determined in connection with the background, from the resultant synthesized image.

DETAILED DESCRIPTION OF THE PREFERRED EMBODIMENTS

Figure 1:
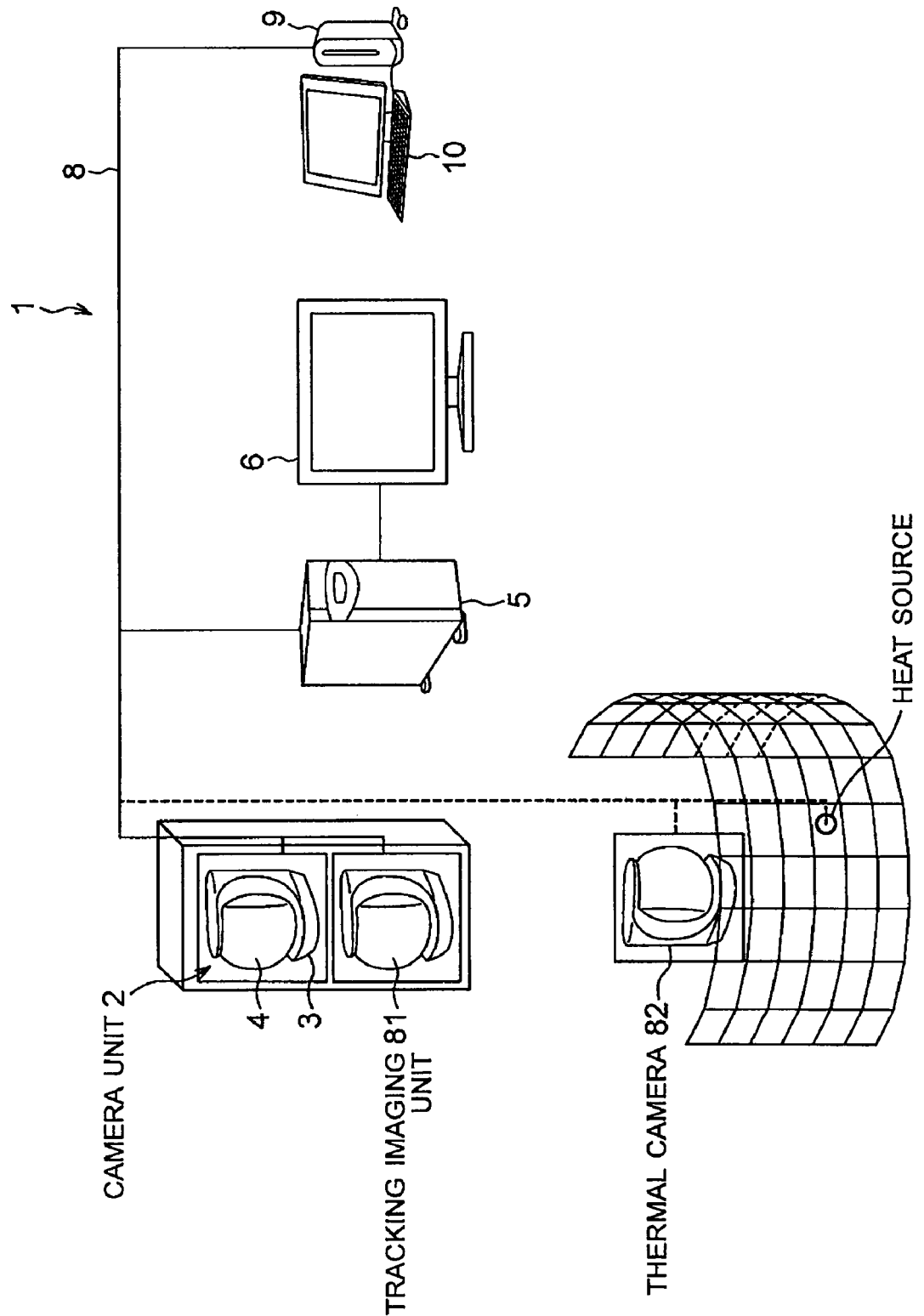
FIG. 1 is a diagram showing a monitor system according to the present invention.

The preferred embodiment of the present invention will be described in detail, with reference to the accompanying drawings. As FIG. 1 shows, a monitor system 1 according to this invention comprises a camera unit 2, a tracking imaging unit 81, a thermal camera 82, a monitoring apparatus 5, a display 6, a terminal device 9, a terminal display 10, and a network 8. The camera unit 2 photographs an object, generating an image signal. The monitoring apparatus 5 receives an image signal from at least the camera unit 2. The display 6 is connected to the monitoring apparatus 5. The terminal device 9 is operated by users to execute application programs. The terminal display 10 is connected to the terminal device 9. The network 8 achieves interactive communication between the camera unit 2, monitoring apparatus 5 and terminal device 9.

The camera unit 2 incorporated in the monitor system 1 comprises a pan-tilter section 3 and a camera section 4 that are formed integral with each other. The pan-tilter section 3 is a rotating base that can change the photographing direction around two axes, i.e., panning axis and tiling axis.

The camera section 4 is held on the pan-tilter section 3 that is a rotating base. Controlled by the monitoring apparatus 5, the camera section 4 photographs an object, while adjusting the photographing direction in the horizontal direction or vertical direction. When the camera section 4 is controlled by the monitoring apparatus 5, it sequentially changes the photographing angle, photographing the object either magnified or reduced scale. Two or more camera sections 4 may be provided for the monitoring apparatus 5. In this case, the same object can be photographed at different angles, providing image that represents images of the object, viewed from different angles.

The monitoring apparatus 5 is constituted by an electronic apparatus such as a personal computer (PC). The apparatus 5 records the image signal and the like that are transmitted from the camera unit 2 and tracking imaging unit 81. The apparatus 5 supplies the recorded image signal and the like to the display 6, which displays images to the user. The user may designate a desired part of the image displayed or a desired position in the image. Then, the monitoring apparatus 5 selects an optimal part of the image signal and causes the display 6 to display that part of the image, which the optimal part of the image signal represents. The monitoring apparatus 5 serves as main control apparatus, as well, to control the entire network 8. Upon receiving requests from any other terminal devices 9, the apparatus 5 transmits the image signal. The configuration of the monitoring apparatus 5 will be described later in detail.

The network 8 is, for example, the Internet in which the monitoring apparatus 5 is connected to the telephone line. Alternatively, it is a public communications network, such as integrated service digital network (ISDN) or broadband-ISDN (B-ISDN), either connected to TAs and modems that can achieve interactive communication of information. If the monitor system 1 is utilized in a small area, the network 8 may be a local area network (LAN). The network 8 may otherwise be a so-called optical-fiber communications network. Further, the network 8 may be designed to transmit MPEG-image data, in addition to still-picture data. If this is the case, the MPEG-image data is continuously transmitted via one channel and the still-picture data is transmitted via another channel at regular intervals, both in accordance with the Internet protocol (IP).

The terminal device 9 is a PC that the user uses at home or in the office, in order to acquire image from the monitoring apparatus 5 through the network 8 so that a desired process may be performed on the image. The terminal device 9 is connected to the network 8, along with other terminal devices 9. The users of these terminal devices 9 can therefore obtain any application program from the monitor system 1 at the same time. The terminal device 9 acquires video data from the monitoring apparatus 5 and supplies the data to the terminal display 10. The terminal display 10 displays the image represented by the video data. When the terminal device 9 is operated by the user, it generates a request signal. The request signal is transmitted to the monitoring apparatus 5. The structure of the terminal device 9 is not explained here; it can be understood from the description of the monitoring apparatus 5.

The components of the monitor system 1 according to this invention will be described in detail, with reference to FIG. 2.

Figure 2:
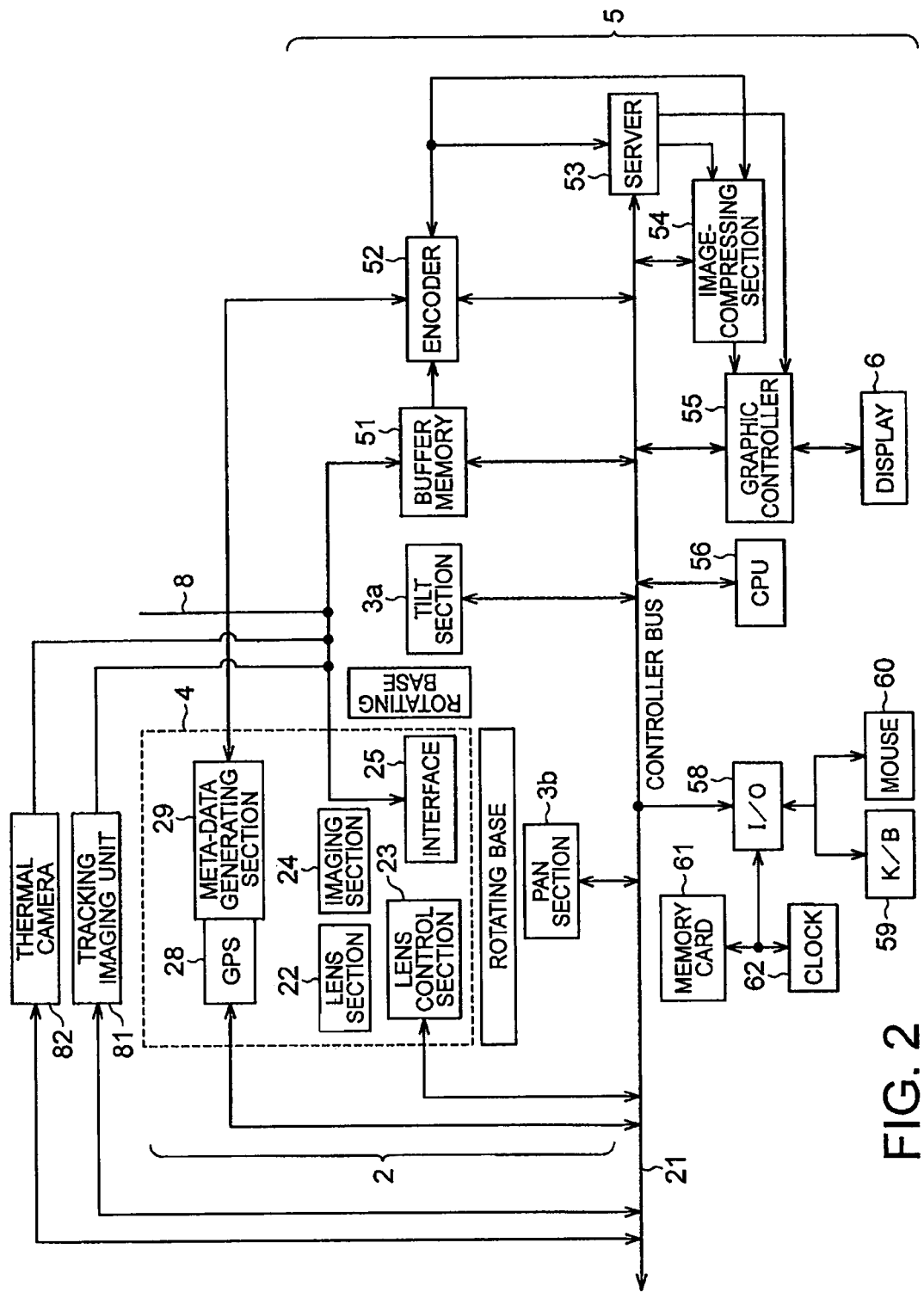
FIG. 2 is a block diagram illustrating the camera unit and the monitoring apparatus that are incorporated in the monitor system.

As is illustrated in FIG. 2, the camera unit 2, tracking imaging unit 81, thermal camera 82 and monitoring apparatus 5 are connected to a controller bus 21.

The pan-tilter section 3 incorporated in the camera unit 2 has a tilt section 3a and a pan section 3b. The tilt section 3a and the pan section 3b cooperate to control the rotating base so that the photographing direction may be changed. The camera section 4, i.e., another component of the camera unit 2, comprises a lens section 22, a lens control section 23, an imaging section 24, an IEEE (Institute of Electrical and Electronics Engineers) 1394 interface 25, a GPS (Global Positioning System)-signal receiving section 28, and a meta-data generating section 29. The main function of the lens control section 23 is to change the angle of view of the lens section 22. The imaging section 24 is arranged, extending at right angles to the optical axis of the lens section 22. The IEEE1394 interface 25 transmits the image signal generated by the imaging section 24, to an image input/output section 13. The GPS-signal receiving section 28 is designed to determine the position that the camera unit 2 takes at present. The meta-data generating section 29 is coupled to the GPS-signal receiving section 28. Note that the IEEE1394 interface 25 may be replaced by an ETHERNET® interface.

The monitoring apparatus 5 comprises a buffer memory 51, an encoder 52, a server 53, an image-compressing section 54, a graphic controller 55, a CPU 56, a memory card 61, and a clock 62. The buffer memory 51 is connected to the IEEE1394 interface 25. The encoder 52 and server 53 are connected to the buffer memory 51. The image-compressing section 54 compresses the image read from the server 53. The graphic controller 55 is connected to the server 53 and image-compressing section 54 and generates image that is to be supplied to the display 6. The CPU 56 supplies control signals via the control bus 21, in order to control the other components of the monitoring apparatus 5. The memory card 61 and the clock 62 are connected to an I/O port 58.

The monitoring apparatus 5 further comprises a keyboard 59 and a mouse 60. The user may operate the keyboard 59 and mouse 60 to designate a desired part of the image displayed by the display 6 or a desired position in the image.

The tilt section 3a and the pan section 3b drive the stepping motor in accordance with a drive signal supplied from the CPU 59. Thus driven, the stepping motor rotates the rotating base. As a result, the photographing direction of the camera section 4 mounted on the rotating base is changed in the horizontal or vertical direction.

In accordance with a drive signal supplied from the CPU 56, the lens control section 23 causes the lens section 22 to perform automatic diaphragm control and automatic focusing control. Based on the same drive signal, the lens control section 23 changes the angle of view with respect to the object that is to be photographed. Thus, the camera section 4 can photograph the object, while sequentially adjusting the photographing magnification.

The imaging section 24 is constituted by a solid-state imaging element such as a charge-coupled device (CCD). The lens section 22 focuses the image of the object on the imaging surface of the section 24. The imaging section 24 performs photoelectric conversion on this image, generating an image signal. The image signal is transmitted to the IEEE1394 interface 25.

The GPS-signal receiving section 28 receives a signal from the GPS system. On the basis of this signal, the section 28 determines the position of the camera unit 2 and the photographing direction thereof. If two or more camera units 2 are installed, the GPS-signal receiving section 28 can make it possible to control the photographing directions of the respective camera units 2. The signal output from the GPS-signal receiving section 28 is supplied to the meta-data generating section 29. The meta-data generating section 29 generates position data items and meta-data. The position data items represent the latitude, longitude, orientation and altitude. The meta-data consists of parameter data items, e.g., time and other parameters. From the meta-data generating section 29, the position data items and the meta-data are supplied to the encoder 52. The GPS-signal receiving section 28 and the meta-data generating section 29 may be omitted from the present invention.

The tracking imaging unit 81 and the thermal camera 82 are similar to the camera unit 2 and will not be described.

The thermal camera 82 is a camera that detects infrared rays emanating from, for example, a human body, thus accomplishing so-called thermography. That is, the camera 82 provides a thermal image that indicates the temperature distribution on the human body. The thermal camera 82 has a detector (not shown) that corresponds to the imaging section 24. The detector detects the infrared rays emanating from the human body. The detector converts the intensity of infrared rays to an electric signal. The electric signal is amplified to a predetermined level. A so-called thermal image is thereby formed. Hereinafter, the signal representing the thermal image will be referred to as "thermal-image signal."

The thermal camera 82 is configured to convert an image of any object the surface temperature of which falls within a preset range, into a thermal image. The temperature range may be set to, for example, temperature of the human body±about 3° C. Then, the thermal camera 82 can detect exclusively the infrared rays coming from the human body. The user can set any desired temperature range in the thermal camera 82, merely by operating a mouse 60 or the like, as will be explained later.

The buffer memory 51 temporarily stores the image signal or thermal-image signal supplied from the IEEE1394 interface 25, in accordance with a control signal supplied from the CPU 56. The image signal or thermal image signal, which is stored in the buffer memory 51, is supplied to the encoder 52. The encoder 52 compresses the data in accordance with, for example, the JPEG (Joint Photographic Experts Group) standards. The encoder 52 may add the position data or meta-data supplied from the meta-data generating section 29, to the image signal or thermal image signal to be compressed and encoded. The encoder 52 outputs the image signal or thermal image signal, thus compressed and encoded, to the server 53 or the image-compressing section 54. The process the encoder 52 performs can be dispensed with, if neither the image signal nor the thermal-image signal is compressed and encoded.

The server 53 records the image signal or thermal image signal output from the encoder 52, in association with the position data and the meta-data. The sever 53 may be replaced by, for example, a hard disc or a disc-shaped recording medium that can be removed. The image signal recorded in the server 53 is read to the image-compressing section 54 or the graphic controller 55, under the control of the CPU 56. The image signal or thermal image signal recorded in the server 53 may be recorded in the memory card 61. In this case, the user can transfer the image signal or thermal image signal to any other PC. Further, the image signal or thermal image signal recorded in the server 53 may be recorded in a network server (not shown). Then, the server 53 can be replaced by the network server.

The image-compressing section 54 generates compressed image data, or thumbnail image data, from the JPEG-type image signal read from the server 53. Controlled by the CPU 56, the image-compressing section 54 reads the image signal from the server 53 and generates a moving-picture data from the image signal read. The method that the image-compressing section 54 carries out to generate the moving-picture data is, for example, MPEG, Motion-JPEG, Motion-JPEG2000, or the like.

The graphic controller 55 processes the image signal or thermal image signal read from the server 53, or the image signal or thermal image signal output from the image-compressing section 54, so that the display 6 may display the image represented by the image signal or thermal image signal. Moreover, the graphic controller 55 controls the contrast and luminance in which the display 6 displays the image.

When the user operates the keyboard 59 or mouse 60, designating a desired part of the image displayed or a desired position in the image, the CPU 56 transmits a drive signal or a control signal via the control bus 21. The drive signal drives the pan-tilter section 3 or the lens control section 23. The control signal controls the components of the monitoring apparatus 5. Upon receiving a request signal from the terminal device 9, the CPU 56 selects an optimal still-picture data item, moving-picture data item or information item, which are stored in the server 53. The data item or information item selected is transmitted to the terminal device 9.

How the monitor system 1 according to this invention operates will be explained below.

Figure 3:
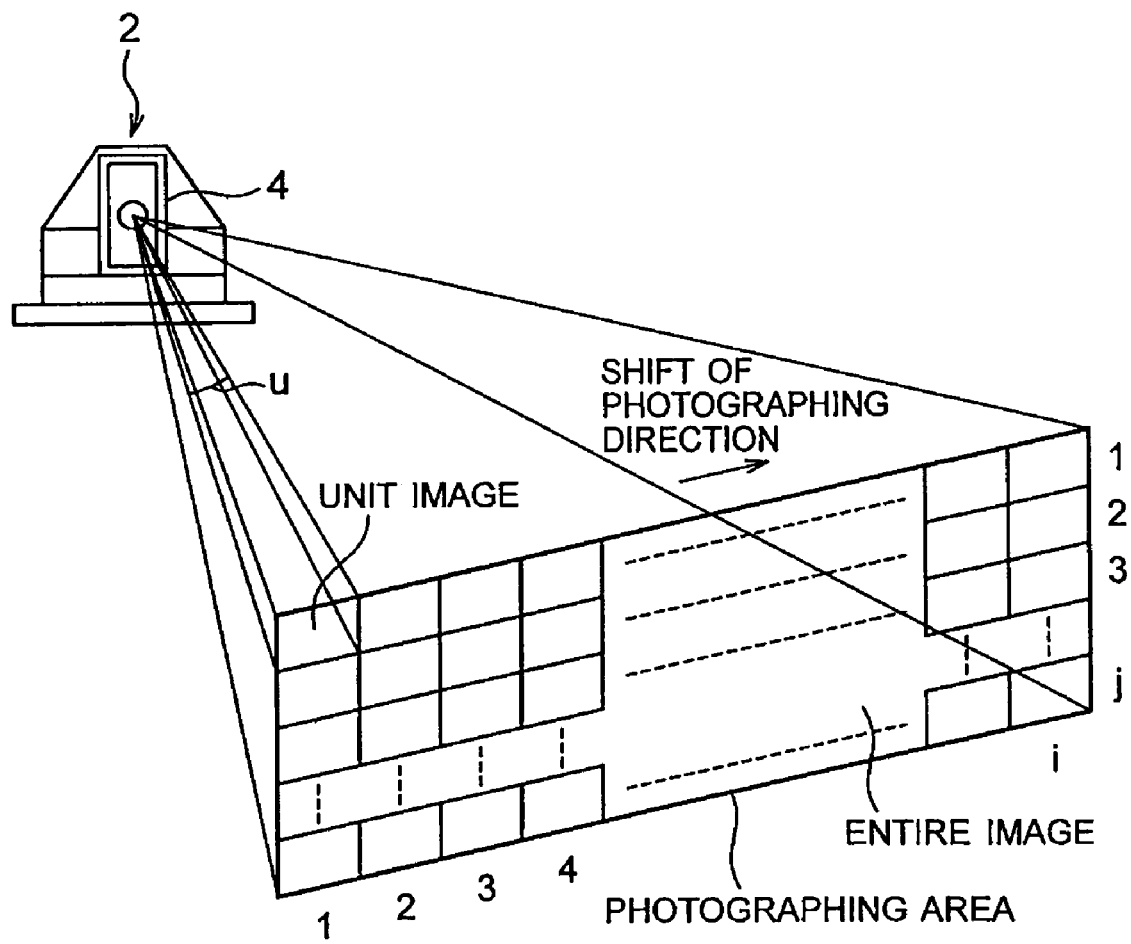
FIG. 3 is a diagram explaining how the camera unit photographs, at a view angle u, an area indicated by a black frame.

FIG. 3 is a diagram explaining how the camera unit 2 photographs, at a view angle u, an area indicated by a block frame. To photograph this area in its entirety at the view angle u, the photographing direction must be sequentially changed in the horizontal direction or vertical direction. Assume that the area to be photographed can be expressed as i×j times the size of a frame (hereinafter called "unit image") obtained at a given photographing view angle u. Then, it is necessary to set at least i×j photographing directions. The i×j unit images, obtained by photographing the object at the view angle u, are combined to provide an image of the entire area.

The unit images constituting the image of the area photographed have coordinates (M, N) each. The X-axis ordinates of the unit images, 1, 2, . . . M, and i, are arranged from the left in the horizontal direction. The Y-axis ordinates of the unit images, 1, 2, . . . N, and j, are arranged from the top in the vertical direction. Thus, when the CPU 56 transmits a drive signal to the tilt section 3a and pan section 3b, the tilt section 3a and the pan section 3b change the photographing direction of the camera section 4, first to the (1, 1) of the upper-left unit image. Then, the camera section 4 photographs the upper-left unit image, generating an image signal. The buffer memory 51 temporarily stores this image signal. The encoder 52 compresses and encodes the image signal in accordance with the JPEG standards. To the image signal thus processed, there are added the position data and the meta-data. Note that the position data is transmitted from the GPS-signal receiving section 28 and represents the photographing direction and the like. The resultant combination of the image signal, the position data and the meta-data is recorded in the server 53.

The CPU 56 transmits another drive signal to the tilt section 3a and pan section 3b. Driven by this signal, the tilt section 3a and pan section 3b shift the photographing direction of the camera section 4 to the right by one frame, setting the direction to the coordinates (2, 1). Then, the camera section 4 photographs the unit image at the coordinates (2, 1), generating an image signal. This image signal is recorded in the server 53, too. Controlled by the CPU 56, the camera section 4 photographs the unit images at the coordinates (3, 1), the coordinates (4, 1), . . . the coordinates (i, 1), one after another, while the photographing direction is being shifted in the horizontal direction.

After the camera section 4 finishes photographing all unit images of the first row, the CPU 56 controls the pan-tilter section 3, which sets the photographing direction at the first coordinates (1, 2) of the second row. The camera section 4 photographs the unit image at the coordinates (1, 2). Under the control of the CPU 56, the camera unit 2 photographs the other unit image, one after another. When the unit 4 finishes photographing the last unit image at the coordinates (i, j), the image signals representing i×j unit images are recorded in the server 53.

The image signals representing the unit images are sequentially read from the server 53 to the image-compressing section 54. The section 54 compresses each input signal, generating a signal that represents an image much smaller than the screen of the display 6. Each unit image thus compressed is supplied via the graphic controller 15 to the display 6. The display 6 displays all i×j unit images, represented by the image signals stored in the server 53. The i×j unit images, thus displayed, constitute a panoramic entire image (panorama image). Namely, an entire image showing the latest state of the area photographed is obtained as the camera unit 2 performs the above-mentioned photographing at regular intervals. The data that represents the panorama image can be stored and managed in the server 53.

Figure 4:
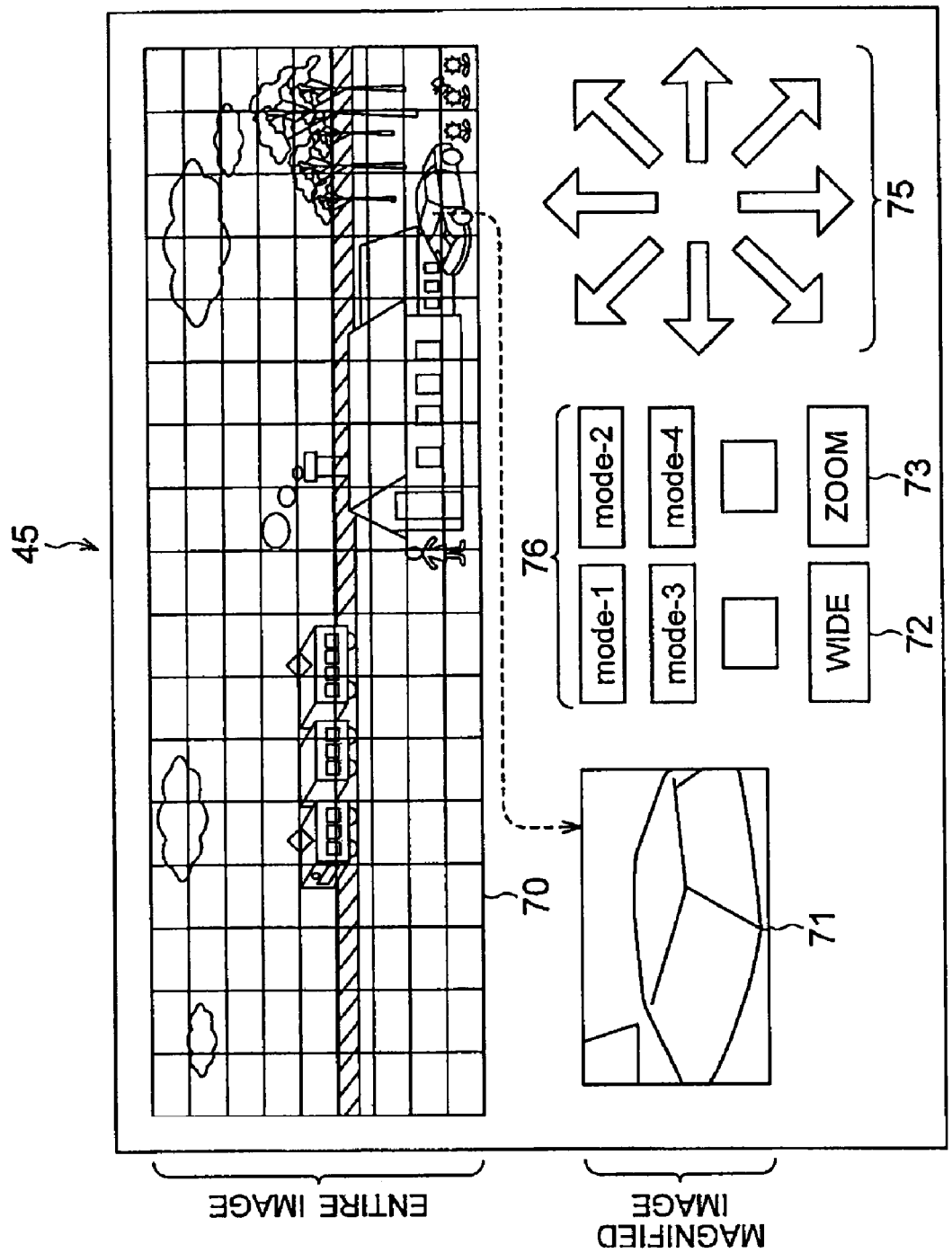
FIG. 4 is a diagram depicting an image displayed in the screen of a display.

FIG. 4 depicts an entire image constituted by i×j unit images and displayed in the entire-image displaying section 70 of the display 6. The monitoring apparatus 5 may cause the entire-image displaying section 70 to display the unit images constituting entire image, along with the borders between the unit images, or display only the entire image that is, so to speak, seamless. Further, the apparatus 5 may cause the entire-image displaying section 70 to display an image of the entire area, photographed at a specific angle of view, instead of the panoramic whole image of the area.

A screen 45 has a magnified image displaying section 71. In the magnified image displaying section 71, any unit image constituting the entire image displayed in the entire-image displaying section 70 designated by the user can be displayed in a magnified form. Alternatively, a moving picture photographed in the photographing direction of a unit image may be displayed in the magnified image displaying section 71. Seeing the moving picture, the user can recognize, in real time, the direction in which the designated unit image has been photographed.

The user can designate a desired part of the image displayed in the entire-image displaying section 70 or the magnified image displaying section 71, or a desired position in the image, by operating the keyboard 59 or the mouse 60. In the image displaying sections 70 and 71, a reference line or a pointer may be displayed, which the user can move by operating the mouse 60 or the like, in order to designate the desired part of the image or the desired position in the image.

Keys 72, 73, 75 and 76 are displayed in the screen 45. The user may select these keys, instead of operating the mouse 60. If the keys are selected, the magnification for any unit image displayed in the magnified image displaying section 71 will be increased or decreased, the photographing direction of the camera section 4 will be adjusted in the horizontal and vertical directions, and various operating modes will be set.

The thermal camera 82 may be operated in the same way as the camera unit 2 is. Then, the thermal camera 82 can provide a panoramic thermal image of the area that is to be monitored. Hereinafter, the panoramic thermal image will be referred to as "panorama thermal image."

Figure 5:
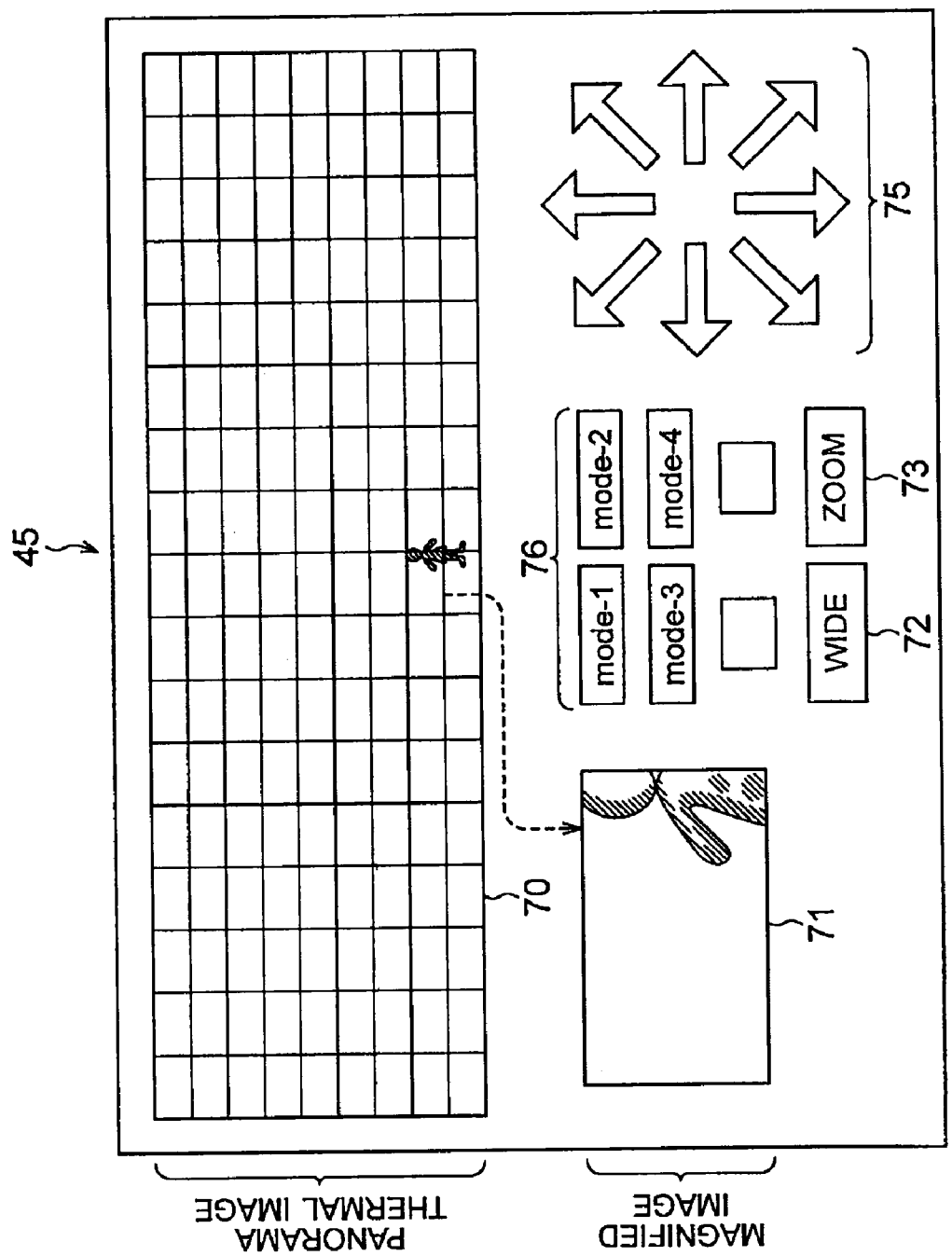
FIG. 5 is a diagram showing a panorama thermal image displayed by a display.

FIG. 5 shows a panorama thermal image displayed in the entire-image displaying section 70. If the temperatures that the thermal camera 82 should detect is temperature of the human body±about 3° C., the thermal image of any region in which a man exists will be displayed as a luminance distribution. As a result, a panorama thermal image constituted by combining thermal images of such regions is displayed as a luminance image, as is illustrated in FIG. 5. The regions other than these are not displayed at all.

The unit images constituting the panorama thermal image have a size that depends on the photographing angle of the thermal camera 82. Nonetheless, they need not be of the same size as the unit images obtained by the camera unit 2.

The user may designate any region in which a man exists. Then, the image of this region can be magnified and displayed in the magnified image displaying section 71. The body temperature distribution in the man or men can be recognized in detail from the luminance distribution displayed in the magnified image displaying section 71.

Figure 6:
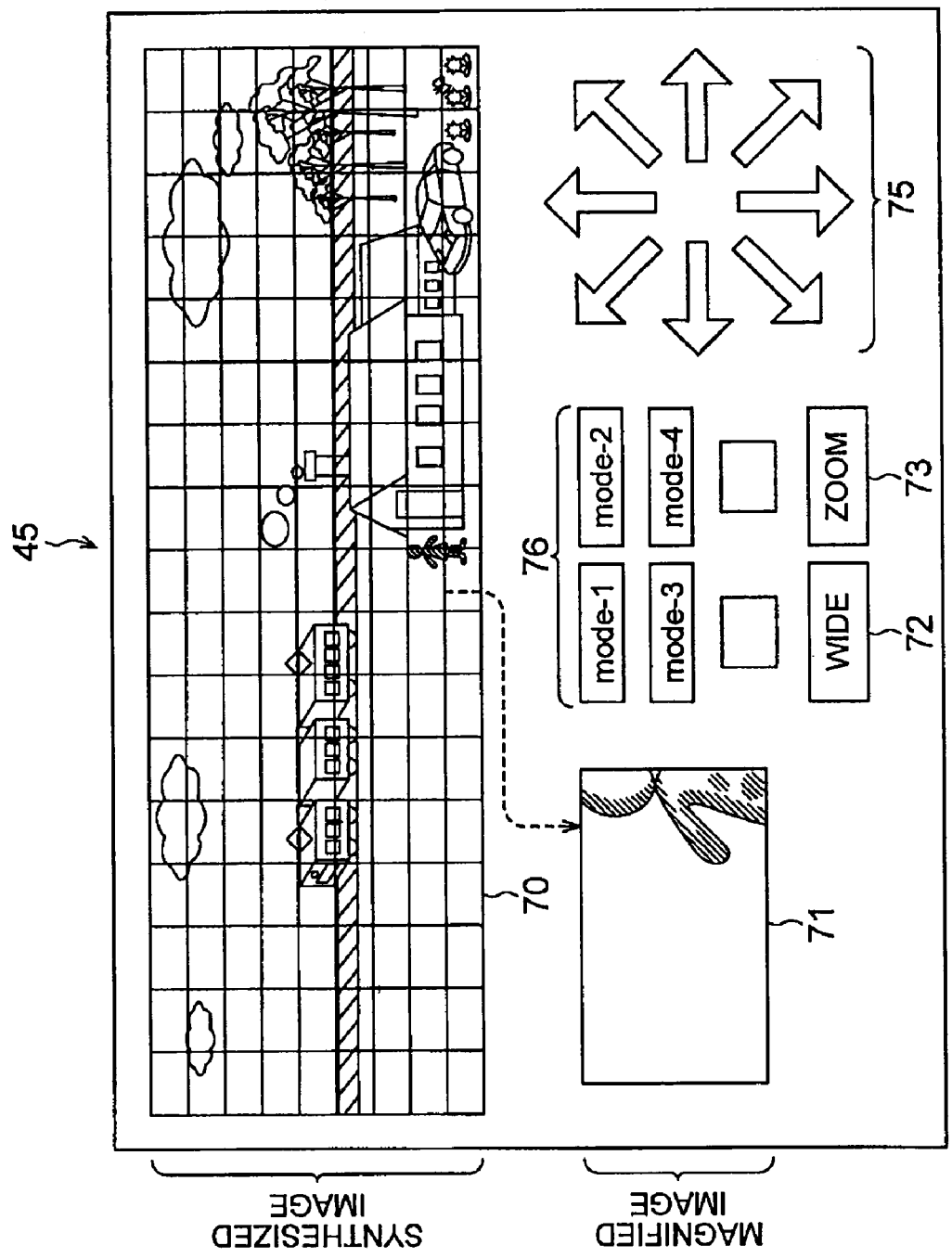
FIG. 6 is a diagram depicting a synthesized image displayed by a display.

In the monitor system 1 according to the present invention, a panorama thermal image may be synthesized with the entire image, forming a synthesized image. The entire-image displaying section 70 may display the synthesized image, as is illustrated in FIG. 6. Seeing the synthesized image displayed in the entire-image displaying section 70, the user can easily recognize any region detected as a thermal image, in which a man exists, in connection with the entire image.

Thus, the present invention enables the watchman to perceive the movement or change of any person in the area photographed, from the luminance distribution shown in the thermal image. Therefore, the watchman need not observe all images, each input every time the camera scans the area. His or her labor can be much reduced. In addition, the invention prevents the watchman from overlooking changes in the area. The invention therefore helps to achieve very reliable surveillance.

If the monitor system 1 is used to perform surveillance at night, the camera unit 2 provides dark entire images only, from which the movement of any person cannot be perceived. Nevertheless, any region in which a man exists can be identified with a specific luminance distribution in any thermal image obtained from the thermal camera 82 that detects the infrared rays emanating from any human body. To determine the position that said region assumes in the area monitored, the dark panorama thermal image obtained at night is synthesized with the entire image obtained in daytime and stored in the server 53. From the resultant synthesized image, the user can correctly determine the position of the man or men identified with the specific luminance distribution, in connection with the background. Hence, the monitor system 1, if installed in an area which unauthorized persons are forbidden to enter, enables the user to recognize, the route along which an intruder is walking in the area, even at night.

In the monitor system 1, the photographing directions of the camera unit 2 and thermal camera 82 are shifted, thereby providing unit images, and the unit images are combined, forming a panorama image. The monitor system 1 is therefore useful, particularly when a broad area is monitored for any intruders.

If a man touches an object such as a wall, heat will be conducted from the hand to the wall, and the touched part of the wall will be displayed as a specific luminance distribution. In this case, the range of temperature detection for the thermal camera 82 is set to an optimal one. Then, the luminance distribution in said touched part to which heat is conducted from the man is discarded so that the thermal image can be generated that show the movement of a man or men only.

In the monitor system 1 according to this invention, the entire-image displaying section 70 displays a synthesized image. The user may click the mouse 60, selecting that part of the synthesized image which has a specific luminance distribution. Then, the tracking imaging unit 81 photographs that part of the area which corresponds to said part of the synthesized image.

If the tracking imaging unit 81 is used, the relative position on the manorama thermal image that the part of the specific luminance distribution takes in the thermal image is detected, and the photographing direction of the tracking imaging unit 81 is then automatically set to the relative position detected.

To make the tracking imaging unit 81 track a specific object such as a man, panorama thermal images are taken at predetermined intervals, and the luminance difference between two panorama thermal images, one preceding the other, and both obtained in the same photographing direction. The relative position of the image region in which a man is displayed at present is thereby recognized. Then, the photographing direction of the tracking imaging unit 81 is set to that relative position of the image region. The sequence of these operations is repeated, thus obtaining the latest images that indicates the movement of the specific object.

The tracking imaging unit 81 may be a camera, such as a snooper scope, which can provide dark-field images. If the watchman recognizes a specific object, such as a human intruder, from the thermal image obtained at night, the tracking imaging unit 81 tracks this object. Thus, the tracking imaging unit 81 keeps photographing the object as it moves, providing images of the specific object in real time even at night.

Moreover, the data representing synthesized images is stored in the server 53 in the monitor system 1. The user of the terminal device 9, who has accessed the monitoring apparatus 5 via the network 8, can observe any synthesized image on the terminal display 10 that is connected to the terminal device 9. If a plurality of terminal devices 9 are connected to the apparatus 5 via the network 8, many users can see the synthesized image at the same time. Further, the data items representing synthesized images, respectively, may be sequentially stored in the server 53 as they are generated. In this case, the user of any terminal device 9 can examine the synthesized images in detail, one by one retroactively.

It should be understood by those skilled in the art that various modifications, combinations, sub-combinations and alterations may occur depending on design requirements and other factors insofar as they are within the scope of the appended claims or the equivalents thereof.

What is claimed is:

1. An imaging apparatus comprising:
   imaging means for photographing an area, while sequentially setting a photographing direction to unit images that constitute a panorama image of the entire area;
   panorama-image generating means for generating a panorama image by combining a plurality of unit images obtained by the imaging means, the panorama-image generating means generating the panorama image by spatially combining the plurality of unit images such that the panorama image is larger than any of the unit images;
   panorama-image storage/management means for storing and managing the panorama image generated by the panorama-image generating means;
   infrared imaging means for photographing an object that emanates infrared rays as an infrared image;
   direction control means for sequentially shifting the photographing direction of the infrared imaging means within the area being photographed;
   infrared-image generating means for combining a plurality of infrared images provided by the infrared imaging means, thereby to generate a panorama infrared image of the entire area, the infrared-image generating means generating the panorama infrared image by spatially combining the plurality of infrared images such that the panorama infrared image is larger than any of the infrared images;
   image-synthesizing means for synthesizing the panorama image generated by the panorama-image generating means, with the panorama infrared image generated by the infrared-image generating means to create a synthesized image; and
   image-displaying means for displaying the synthesized image generated by the image-synthesizing means.

2. The imaging apparatus according to claim 1, further comprising temperature-range setting means for setting the temperature range.

3. The imaging apparatus according to claim 1, further comprising tracking imaging means for photographing the object by setting the photographing direction to the object, when the infrared imaging means photographs the object that has a temperature falling within a preset temperature range.

4. The imaging apparatus according to claim 3, wherein the tracking imaging means is a camera that can photograph dark-field images.

5. An imaging method comprising:
   photographing an area, while sequentially setting a photographing direction to unit images that constitute a panorama image of the entire area;
   generating a panorama image by spatially combining a plurality of unit images obtained in the photographing such that the panorama image is larger than any of the unit images;
   storing and managing the panorama image generated in the generating a panorama image;
   controlling a infrared imaging unit for photographing an object that emanates infrared rays as an infrared image, while sequentially shifting the photographing direction of the infrared imaging unit within the area being photographed;
   generating a panorama infrared image of the entire area by spatially combining a plurality of infrared images provided by the infrared imaging unit such that the panorama infrared image is larger than any of the infrared images;
   synthesizing the panorama image generated in the generating a panorama image with the panorama infrared image generated in the generating a panorama infrared image to create a single synthesized image including both image and infrared data; and
   displaying the synthesized image generated in the synthesizing.

6. The imaging method according to claim 5, further comprising setting the temperature range.

7. The imaging method according to claim 5, further comprising:
   photographing the object by setting the photographing direction to the object, when the infrared imaging unit photographs the object that emanates infrared rays.

8. The imaging method according to claim 7, wherein dark-field images are photographed in the photographing the object.

9. A computer readable medium including computer executable instructions, wherein the instructions, when executed by a processor, cause the processor to perform a method comprising:
   photographing an area, while sequentially setting a photographing direction to unit images that constitute a panorama image of the entire area;

generating a panorama image by spatially combining a plurality of unit images obtained in the photographing such that the panorama image is larger than any of the unit images;

storing and managing the panorama image generated in the generating a panorama image;

controlling an infrared camera in an infrared imaging unit that photographs an object having a temperature falling within a preset temperature range as a infrared image, while sequentially shifting the photographing direction of the infrared imaging unit within the area being photographed;

generating a panorama infrared image of the entire area by spatially combining a plurality of infrared images provided by the infrared imaging unit such that the panorama inured image is larger than any of the infrared images;

synthesizing the panorama image generated in the generating a panorama image with the panorama infrared image generated in the generating a panorama infrared image to create a single synthesized image including both image and infrared data; and displaying the synthesized image generated in the synthesizing.

10. An imaging system comprising:

imaging means;

infrared imaging means for photographing an object that emanates infrared rays as an infrared image;

a control apparatus including:
  panorama-image generating means for generating a panorama image of the entire area by combining a plurality of unit images obtained by the imaging means, the panorama-image generating means generating the panorama image by spatially combining the plurality of unit images such that the panorama image is larger than any of the unit images;
  panorama-image storage/management means for storing and managing the panorama image generated by the panorama-image generating means;
  direction control means for sequentially shifting the photographing direction of the infrared imaging means within the area being photographed;
  infrared-image generating means for combining a plurality of infrared images provided by the infrared imaging means, thereby to generate a panorama infrared image of the entire area, the infrared-image generating means generating the panorama infrared image by spatially combining the plurality of infrared images such that the panorama infrared image is larger than any of the infrared images; and
  image-synthesizing means for synthesizing the panorama image generated by the panorama-image generating means, with the panorama infrared image generated by the infrared-image generating means; and
  at least one terminal device that is configured to access the control apparatus through a network, to acquire the synthesized image generated by the image-synthesizing means, by accessing the control apparatus, and to display the synthesized image acquired.

11. An imaging apparatus comprising:

a camera unit;

a panorama-image generating section configured to generate a panorama image of the entire area by combining a plurality of unit images obtained by the camera unit, the panorama-image generating section configured to generate the panorama image by spatially combining the plurality of unit images such that the panorama image is larger than any of the unit images;

a panorama-image storage/management section configured to store and manage the panorama image generated by the panorama-image generating section;

an infrared camera configured to photograph an object that has a temperature falling within a preset temperature range as a infrared image;

an direction controller configured to sequentially shift the photographing direction of the infrared camera within the area being photographed;

an infrared-image generating section configured to combine a plurality of infrared images provided by the infrared camera, thereby to generate a panorama infrared image of the entire area, the infrared-image generating section configured to generate the panorama infrared image by spatially combining the plurality of infrared images such that the panorama infrared image is larger than any of the infrared images;

an image-synthesizing section configured to synthesize the panorama image generated by the panorama-image generating section, with the panorama infrared image generated by the infrared-image generating section;

a display configured to display the synthesized image generated by the image-synthesizing section.

12. An imaging system comprising:

a camera unit;

an infrared camera configured to photograph an object that has a temperature falling within a preset temperature range as an infrared image;

a control apparatus including:
  a panorama-image generating section configured to generate a panorama image of the entire area by combining a plurality of unit images obtained by the camera unit, the panorama-image generating section configured to generate the panorama image by spatially combining the plurality of unit images such that the panorama image is larger than any of the unit images;
  a panorama-image storage/management section configured to store and manage the panorama image generated by the panorama-image generating section;
  a direction controller configured to sequentially shift the photographing direction of the infrared camera within the area being photographed;
  an infrared-image generating section configured to combine a plurality of infrared images provided by the infrared camera, thereby to generate a panorama infrared image of the entire area, the infrared-image generating section configured to generate the panorama infrared image by spatially combining the plurality of infrared images such that the panorama infrared image is larger than any of the infrared images; and
  an image-synthesizing section configured to synthesize the panorama image generated by the panorama-image generating section, with the panorama infrared image generated by the infrared-image generating section; and
  at least one terminal device that is configured to access the control apparatus through a network, to acquire the synthesized image generated by the image-synthesizing section, by accessing the control apparatus, and to display the synthesized image acquired.

* * * * *